United States Patent
Yamashita et al.

(10) Patent No.: US 8,931,872 B2
(45) Date of Patent: Jan. 13, 2015

(54) PRINTING APPARATUS, COLOR CONVERSION METHOD, PROGRAM, AND RECORDING MEDIUM

(75) Inventors: Mitsuhiro Yamashita, Matsumoto (JP); Seishin Yoshida, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 322 days.

(21) Appl. No.: 13/290,347

(22) Filed: Nov. 7, 2011

(65) Prior Publication Data

US 2012/0113178 A1 May 10, 2012

(30) Foreign Application Priority Data

Nov. 10, 2010 (JP) .................. 2010-252190

(51) Int. Cl.
- *B41J 2/205* (2006.01)
- *B41J 2/21* (2006.01)
- *H04N 1/60* (2006.01)

(52) U.S. Cl.
CPC .............. *B41J 2/2114* (2013.01); *B41J 2/2103* (2013.01); *H04N 1/6038* (2013.01); *H04N 1/6058* (2013.01)
USPC ............................................ 347/15; 358/518

(58) Field of Classification Search
CPC .................................................... H04N 1/6038
USPC .......................................................... 347/15
See application file for complete search history.

(56) References Cited

U.S. PATENT DOCUMENTS

| | | |
|---|---|---|
| 6,655,798 B2 | 12/2003 | Temple |
| 2002/0126302 A1 | 9/2002 | Fukao |
| 2010/0177354 A1 | 7/2010 | Yoshida |
| 2010/0177357 A1 | 7/2010 | Yoshida |

FOREIGN PATENT DOCUMENTS

| | | |
|---|---|---|
| JP | 2002-223366 A | 8/2002 |
| JP | 2002-530229 A | 9/2002 |
| JP | 2005-052984 A | 3/2005 |
| JP | 2010-162707 A | 7/2010 |
| JP | 2010-162708 A | 7/2010 |

*Primary Examiner* — Manish S Shah
*Assistant Examiner* — Jeffrey C Morgan
(74) *Attorney, Agent, or Firm* — Maschoff Brennan

(57) ABSTRACT

A printing apparatus, which performs the printing using a polish and a colorant includes a reduction region setting portion that sets a reduction region, which is a region where an amount of the polish is reduced, at a dark portion side of a color gamut of the printing apparatus in a device-independent color space; and a color conversion portion which converts color of an image to be input to the printing apparatus into a print color to be expressed by the polish and the colorant, wherein, among pixels constituting the image, in a pixel included in the reduction region, the color conversion portion reduces the amount of the polish compared to a pixel not included in the reduction region, and converts color of the image to the print color.

11 Claims, 13 Drawing Sheets

[CASE OF INSIDE METALLIC INK REDUCTION REGION]

[CASE OF OUTSIDE METALLIC INK REDUCTION REGION]

SECOND EMBODIMENT

SECOND EMBODIMENT
[CASE OF INSIDE METALLIC INK REDUCTION REGION]

SECOND EMBODIMENT
[CASE OF OUTSIDE METALLIC INK REDUCTION REGION]

THIRD EMBODIMENT

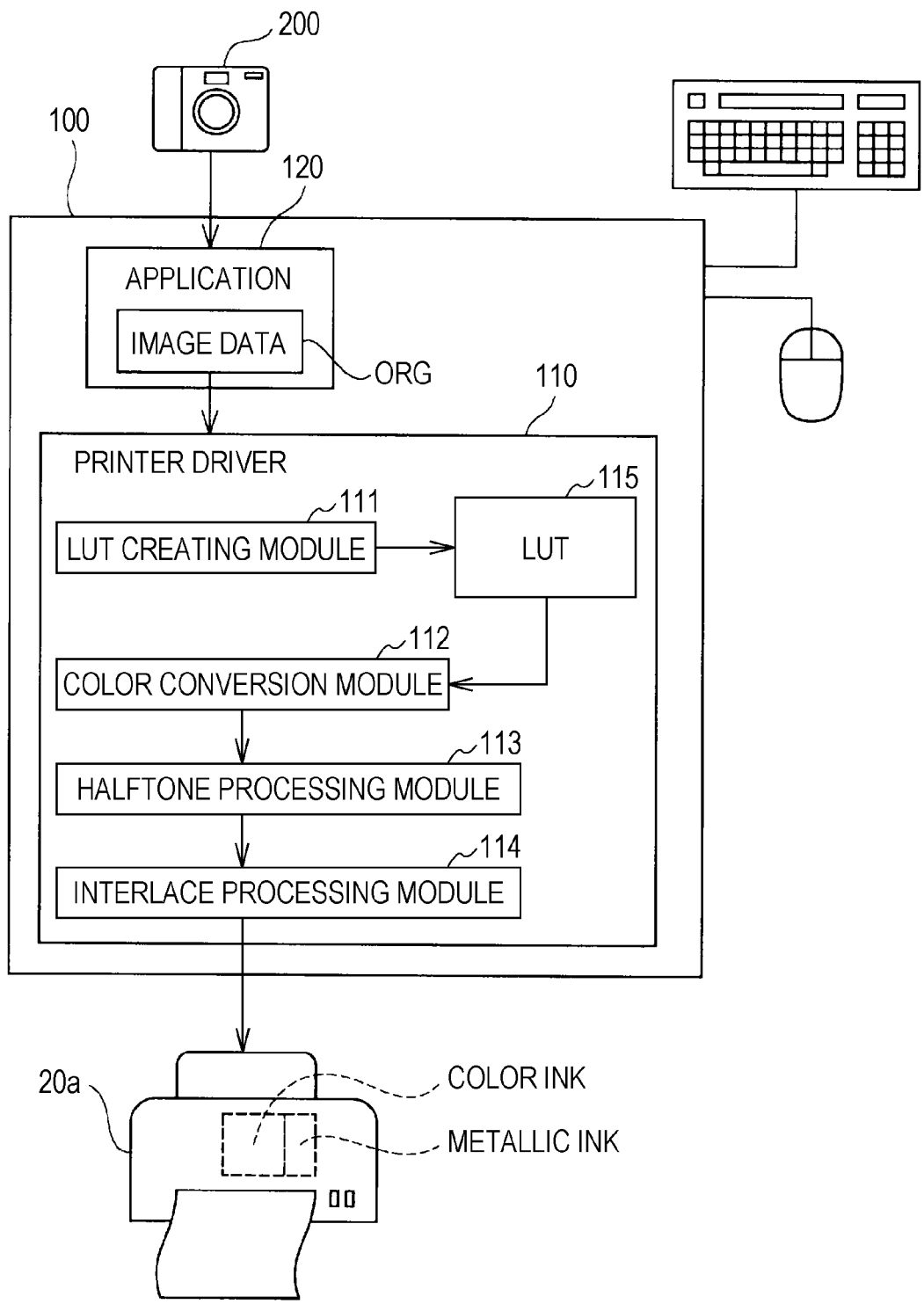

SECOND MODIFIED EXAMPLE

SECOND MODIFIED EXAMPLE

PRINTING APPARATUS, COLOR CONVERSION METHOD, PROGRAM, AND RECORDING MEDIUM

Priority is claimed under 35 U.C.S. §119 to Japanese Application No. 2010-252190 filed on Nov. 10, 2010 which is hereby incorporated by reference in its entirety.

BACKGROUND

1. Technical Field

The present invention relates to a printing technique that performs the printing using a polish and a colorant.

2. Related Art

In the past, a method is known which firstly forms an undercoat and further performs the printing on the undercoat (for example, JP-T-2002-530229 and JP-A-2005-52984) on a printing medium. Such a method can be used in various printing methods and, for example, can also be used in a case of reproducing metallic colors of various color tones. In order to reproduce the metallic color, for example, a layer of the metallic ink is formed on a print medium, and color ink may be superimposed thereon to perform the printing.

Since the metallic ink is relatively expensive, there is a problem in that a used amount thereof is reduced. Furthermore, when color ink is equally superimposed on the layer of the metallic ink, in a relatively dark portion (a dark region) of an image, brightness (luminance) is increased by a glossy expression effect of the metallic ink, compared to a case of performing the printing only by the color ink. In addition, since the amount of color ink is reduced as the metallic ink is superimposed, the brightness is increased compared to the case of not superimposing the metallic ink. For this reason, in the dark region of the image, there is a problem in that a degree (a gradation reproduction) of a change in brightness drops in respect to a gradation change of the pixel.

In addition, the problem was common to the case of using various glossy inks expressing a texture other than the coloring such as, for example, ink containing the pigment expressing the glossy feeling similar to a pearl gloss, without being limited to the metallic ink that contains a metallic pigment expressing a metallic glossy feeling. Furthermore, the problem was common to various printing apparatuses that perform the printing using the polish and the colorant.

SUMMARY

An advantage of some aspects of the invention is to improve gradation reproducibility in a dark region of an image and, along with this, reduce the amount of polish used in a printing apparatus that performs the printing using the polish and the colorant.

The invention solves at least a part of the problems mentioned above and can also be realized as the forms and applications below.

Application 1

A printing apparatus which performs the printing using a polish and a colorant, the printing apparatus including: a reduction region setting portion that sets a reduction region, which is a region where an amount of polish is reduced, at a dark portion side of a color gamut of the printing apparatus in a device-independent color space; and a color conversion portion which converts color of an image to be input to the printing apparatus into a print color to be expressed by the polish and the colorant, wherein, among pixels constituting the image, in pixels included in the reduction region, the color conversion portion reduces the amount of the polish compared to pixels not included in the reduction region, and converts the color of the image to the print color.

In the printing apparatus of application 1, since, among pixels constituting the image, in the pixel included in the reduction region, the amount of the polish is reduced compared to the pixel not included in the reduction region, and the color of the image is converted to the print color, in the dark portion side in the image, the amount of colorant can be increased, the gradation reproducibility can be improved, and the amount of polish used during image printing can be reduced. Furthermore, since the reduction region, which is used in deciding whether or not the amount of polish is reduced, is a region in the device-independent color space, upon being converted to the print color, it is possible to reduce the amount of polish used to be within a suitable color range.

Application 2

The printing apparatus according to application 1, wherein the color conversion portion converts the pixels included in the reduction region among the pixels constituting the image to the print color in which the amount of polish is 0.

By such a configuration, since the pixel included in the reduction region can be printed without using the polish, the amount of polish used during image printing can be greatly reduced. Thus, since the used amount of the relatively expensive polish can be greatly reduced, the running costs incurred by the printing can be greatly reduced.

Application 3

The printing apparatus according to application 1 or application 2, wherein the reduction region setting portion has an acquisition portion which acquires a plurality of intersection points obtained for each of a plurality of hues in which a relation line indicating a relationship between a color gradation of a printing region of the case of performing the printing only using the colorant and an index value relating to a color brightness intersects with a relation line indicating a relationship between a color gradation of a printing region of the case of performing the printing using the colorant and the polish and the index value; a three-dimensional shape determination portion which determines a predetermined three-dimensional shape in the color space based on a plurality of reduction region reference points which are points corresponding to a plurality of intersection points in the color space; and a region determination portion that obtains an overlap region between the color gamut and the inner portion of the three-dimensional shape and determines the overlap region as a deletion region.

According to the configuration, in the color space, it is possible to suppress an occurrence of a reversal phenomenon of the brightness in which the index value becomes smaller in the pixel having the brighter color. Thus, when the image after the color conversion is printed by the color conversion portion, a soft gradation change can be realized.

Application 4

The printing apparatus according to application 3, wherein the predetermined three-dimensional shape is an elliptical shape in which a surface of the elliptical shape is disposed in the color space so as to be close to the plurality of reduction region reference points.

According to the configuration, it is possible to smooth a boundary between the reduction region and a non-reduction region. Thus, for example, between adjacent pixels in the color space, it is possible to suppress the brightness of the boundaries, in which the amount of polish used is reduced, from being extremely different, whereby it is possible to suppress an occurrence of the unnatural gradation change in the image. In addition, since the elliptical shape is defined using many parameters, it is possible to determine the elliptical shape having the surface adjacent to each reduction region reference point. Therefore, it is possible to determine the reduction region having the surface close to each reduction region reference point.

Application 5

The printing apparatus according to application 4, wherein the color space is L*a*b* color space, and a value of L* of a central position of the elliptical shape is a negative value.

When the value of L* of the central position of the elliptical shape is a positive value and a radius of a L* direction of the elliptical shape is small, since the elliptical shape does not exist near a lower end of the color gamut of the printing apparatus in the L*a*b* color space, a region can be generated where the color gamut is not superimposed on the inner portion of the elliptical shape. In this case, since the value of L* is not included in the reduction region despite the small value thereof, a reversal phenomenon of the brightness can be generated in which the polish is not reduced and the index value becomes smaller in the pixel having the brighter color. However, by such a configuration, the reversal phenomenon of the brightness can be suppressed. In addition, since the reduction region is set in the L*a*b* color space that is the three-dimensional color space, the reduction region can easily be set compared to a configuration in which the reduction region is set in a multidimensional color space equal to or greater than four dimensions.

Application 6

The printing apparatus according to application 3, wherein the predetermined three-dimensional shape is an umbrella shape that is formed by a plurality of planes specified by two arbitrary reduction region reference points adjacent to each other and a specific reference point among other reduction region reference points except for the specific reference point, in the color space, by using the specific reference point, which is a reduction region reference point corresponding to the intersection point obtained in a gray axis, as a vertex, among the plurality of reduction region reference points.

According to such a configuration, each reduction region reference point can be disposed in a boundary between the reduction region and the non-reduction region. Thus, in each color, the reversal phenomenon of the brightness can be suppressed with a higher probability in each color phase.

Application 7

The printing apparatus according to application 3, wherein the predetermined three-dimensional shape is an arm shape that is specified by an annular periodic spline curve obtained using another reduction region reference point except for the specific reference point which is a reduction region reference point corresponding to the intersection point obtained in the gray axis among the plurality of reduction region reference points, and a secondary curve that sets the specific reference point as a vertex and passes through two other arbitrary reduction region reference points.

According to such a configuration, it is possible to determine a reduction region that has a surface close to each reduction region reference point.

Application 8

The printing apparatus according to application 3 to application 7, wherein the index value is lightness that is measured by setting an irradiation angle to 45° and a light receiving angle to 0°.

According to such a configuration, the reduction region can be set with accuracy close to the discrimination ability of the human eye.

Application 9

The printing apparatus according to application 1 to application 8, further including a printing portion that prints an image converted to the print color and obtains a print image, wherein the color space has at least a coordinate axis concerning the color lightness, and when the printing portion prints the image in which the color expressed by each coordinate included in an arbitrary plane including the coordinate axis in the color space is expressed while maintaining the arrangement relationship of each coordinate, in the print image, the boundaries between a region having a dot recording rate of the polish equal to or less than a predetermined value and a region having a dot recording rate greater than the predetermined value are continuously disposed.

According to such a configuration, it is possible to improve the gradation reproducibility in the dark portion side of the image and actually print an image having an improved image quality. Furthermore, in the print image, it is possible to easily confirm that the gradation reproducibility in the dark portion region is improved.

Application 10

A printing control device, which controls a printing apparatus performing the printing using a polish and a colorant, the printing control device including: a reduction region setting portion that sets a reduction region which is a region where the amount of polish is reduced at a dark portion side of a color gamut of the printing apparatus in a device-independent color space; and a color conversion portion that converts the color of the image to be input to the printing control device to a print color expressed by the polish and the colorant, wherein, among the pixels constituting the image, the pixel included in the reduction region is given a reduced amount of polish compared to the pixel not included in the reduction region and the color of the image is converted to the print color.

According to the printing control device according to application 10, among the pixels constituting the image, the pixel included in the reduction region is given a reduced amount of polish compared to the pixel not included in the reduction region and the color of the image is converted to the print color. Thus, the amount of colorant can be increased at the dark portion side in the image, the gradation reproducibility can be improved, and along with this, it is possible to reduce the amount of polish used during image printing by the printing apparatus. Furthermore, since the reduction region, which is a region used in deciding whether or not the amount of the polish is reduced, is a region in the device-independent color space, it is possible to reduce the amount of polish used to be within a suitable color range when performing conversion to the print color.

Application 11

A color conversion method of converting color of an image to a print color that is expressed by a polish and a colorant used in a printing apparatus, the method including: (a) setting a reduction region, which is a region where the amount of polish is reduced, at a dark portion side of a color gamut of the printing apparatus in a device-independent color space; and (b) reducing the amount of polish in a pixel included in the reduction region among pixels constituting the image, compared to a pixel not included in the reduction region, and converting the color of the image to the print color.

In the color conversion method of application 11, among pixels constituting the image, in the pixel included in the reduction region, the amount of polish is reduced compared to the pixel not included in the reduction region, and the color of the image is converted to the print color. Thus, at the dark portion side in the image, the amount of colorant can be increased, the gradation reproducibility can be improved, and along with this, the amount of polish used during image printing by the printing apparatus can be reduced. Furthermore, since the reduction region, which is used in deciding whether or not the amount of polish is reduced, is a region in the device-independent color space, upon being converted to the print color, it is possible to reduce the amount of polish used to be within a suitable color range.

Application 12

A program for converting color of an image to a print color expressed by a polish and a colorant used in a printing apparatus, in which the program causes a computer to realize a function of setting a reduction region, which is a region reducing the amount of polish, at a dark portion side of a color gamut of the printing apparatus in a device-independent color space; and a function of reducing the amount of polish in a pixel included in the reduction region among the pixels constituting the image compared to a pixel not included in the reduction region, and converting the color of the image to the print color.

In the program of application 12, among pixels constituting the image, in the pixel included in the reduction region, the amount of polish is reduced compared to the pixel not included in the reduction region, and the color of the image is converted to the print color. Thus, at the dark portion side in the image, the amount of colorant can be increased, the gradation reproducibility can be improved, and along with this, the amount of polish used during image printing by the printing apparatus can be reduced. Furthermore, since the reduction region, which is used in deciding whether or not the amount of polish is reduced, is a region in the device-independent color space, upon being converted to the print color, it is possible to reduce the amount of polish used to be within a suitable color range.

Application 13

A recording medium on which the program according to application 12 is recorded and which can be read by a computer.

According to such a configuration, each function can be realized by causing a computer to read the program using the recording medium.

In addition, the invention can be realized in various forms, and, for example, can be realized in forms such as a color converting LUT, a color converting LUT writing method, a computer program for the LUT writing, and a recording medium written with the computer program.

BRIEF DESCRIPTION OF THE DRAWINGS

The invention will be described with reference to the accompanying drawings, wherein like numbers reference like elements.

FIG. 14 is an explanatory diagram that shows an application of the invention to a computer in a first modified example.

DESCRIPTION OF EXEMPLARY EMBODIMENTS

A. First Embodiment

A1. Configuration of Printing Apparatus

Figure 1:
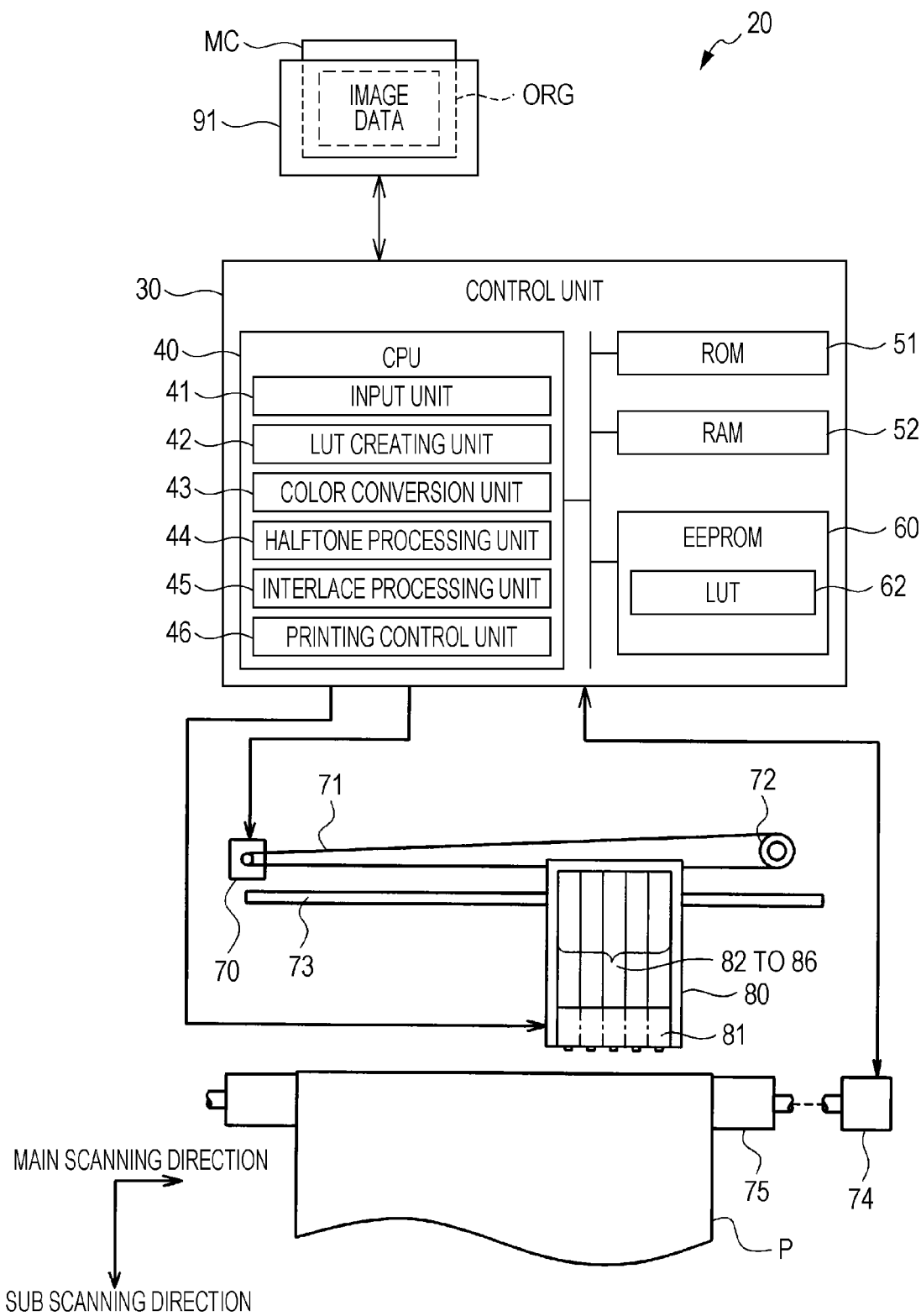
FIG. 1 is a schematic configuration diagram of a printer as an embodiment of the invention.

FIG. 1 is a schematic configuration diagram of a printer as an embodiment of the invention. A printer 20 is an ink jet type printer that includes a mechanism that transports a print medium P by a paper transport motor 74, a mechanism that causes a carriage 80 to reciprocate in an axial direction of a platen 75 by a carriage motor 70, a mechanism that drives a print head 81 mounted on the carriage 80 and performs the discharging and the dot formation of ink, and a control unit 30 that governs the exchange between the paper transport motor 74, the carriage motor 70, and the print head 81.

The mechanism causing the carriage 80 to reciprocate in the axial direction of the platen 75 includes a sliding shaft 73 that is installed parallel to the axis of the platen 75 and holds the carriage 80 in a slidable manner, a pulley 72 that installs an endless driving belt 71 between the pulley 72 and the carriage motor 70 in a tensed manner or the like.

The carriage 80 is mounted with ink cartridges 82 to 85 for color ink which accommodate cyan ink C, magenta ink M, yellow ink Y, and black ink K, respectively. Furthermore, the carriage 80 is mounted with an ink cartridge for metallic ink 86 accommodating metallic ink S. A lower print head 81 of the carriage 80 is formed with a nozzle row corresponding to each color ink and the metallic ink S mentioned above. Upon mounting such ink cartridges 82 to 86 on the carriage 80 from the upside, the supply of ink from each cartridge to the print head 81 becomes possible.

In addition, in the present embodiment, the case of "color ink" means a concept also including black ink. Furthermore, in the present embodiment, a pigment ink is used in the color ink.

Furthermore, the metallic ink is ink by which printed matter can express a metallic feeling. As such a metallic ink, for example, it is possible to use an oil-based ink composition including a metallic pigment, an organic solvent, and resin. In order to effectively generate a visually metallic texture, the metallic pigment is preferably a flat plate-shaped particle. When a long diameter on the plane of the flat plate-shaped particle is X, a short diameter thereof is Y, and a thickness thereof is Z, 50% average particle diameter R50 of an equivalent circle diameter obtained from an area of XY plane of the flat plane-shape particle is 0.5 to 3 μm, and, preferably satisfies a condition of R50/Z>5. Such a metallic pigment can be formed by, for example, aluminum or aluminum alloy and can also be made by crushing a metal deposition film. A concentration of the metallic pigment included in the metallic ink can be, for example, 0.1 to 10.0 weight %. Of course, the metallic ink can suitably adopt another composition if the metallic feeling is generated, without being limited such a composition.

In the present embodiment, the composition of the metallic ink S was aluminum pigment of 1.5 weight %, glycerin of 20 weight %, triethylene glycol monobutyl ether of 40 weight %, and BYK-UV 3500 (manufactured by BYK Japan KK) of 0.1 weight %.

The control unit 30 has a configuration in which a CPU 40, a ROM 51, a RAM 52, and an EEPROM 60 are connected to each other by a bus. Furthermore, a memory card slot 91 is connected to the control unit 30. The memory card slot 91 accommodates a memory card MC on which image data ORG is recorded. In the present embodiment, the image data ORG is data formed of three color components of red (R), green (G), and blue (B).

The CPU 40 functions as an input portion 41, an LUT creation portion 42, a color conversion portion 43, a halftone processing portion 44, an interlace processing portion 45, and a print control portion 46 by developing the program memorized in the ROM 51 or the EEPROM 60 to the RAM 52 and executing the program.

The input portion 41 reads the image data ORG from the memory card MC inserted in the memory card slot 91. The LUT creation portion 42 executes an LUT creation process described later. The color conversion portion 43 converts the image data ORG (R, G, and B) to the ink color (CMYKS) data. The halftone processing portion 44 executes the halftone processing. The interlace processing portion 45 performs the interlace processing of sorting to a dot pattern data printed in the unit of one main scanning. The print control portion 46 controls the reciprocation of the carriage 80 or the paper transport, and along with this, drives the print head 81, and controls the ink discharging to the print medium P.

In the EEPROM 60, a look-up table "(LUT) 62" is memorized. The LUT 62 is a table which associates an input value of an RGB type and an output value of a CMYKS type with each other. Furthermore, in the EEPROM 60, profile data, which indicates a color gamut (a color reproduction range) of the printer 20, is memorized in advance. In the present embodiment, as the profile data, data is adopted which indicates the color gamut in the L*a*b* color space that is the device-independent space.

The printer 20 having the hardware configuration mentioned above causes the print head 81 to reciprocate in a main scanning direction to the print medium P by driving the carriage motor 70, and moves the print medium P in a sub scanning direction by driving the paper transport motor 74. The control unit 30 (the print control portion 46) forms a suitable color ink dot at a suitable position on the print medium P by driving the nozzle at a suitable timing based on the print data with the movement (the main scanning) by which the carriage 80 reciprocates or the movement (the sub scanning) of the paper transport of the print medium. In this manner, the printer 20 can perform the metallic printing (the printing in which the dot of the color ink is mixed with the metallic ink) of the image, based on the image data ORG output from the memory card MC.

In the printer 20, by performing the color conversion using the LUT 62 written by an LUT creation processing described later, the gradation reproducibility of the image in the dark portion region is improved, and along with this, the amount of the metallic ink S used can be reduced.

In addition, the metallic ink S mentioned above corresponds to the polish in the claims. Furthermore, the color ink corresponds to a colorant in the claims, and the LUT creation portion 42 corresponds to a reduction region setting portion in the claims, respectively.

A2. Printing Processing

Figure 2:
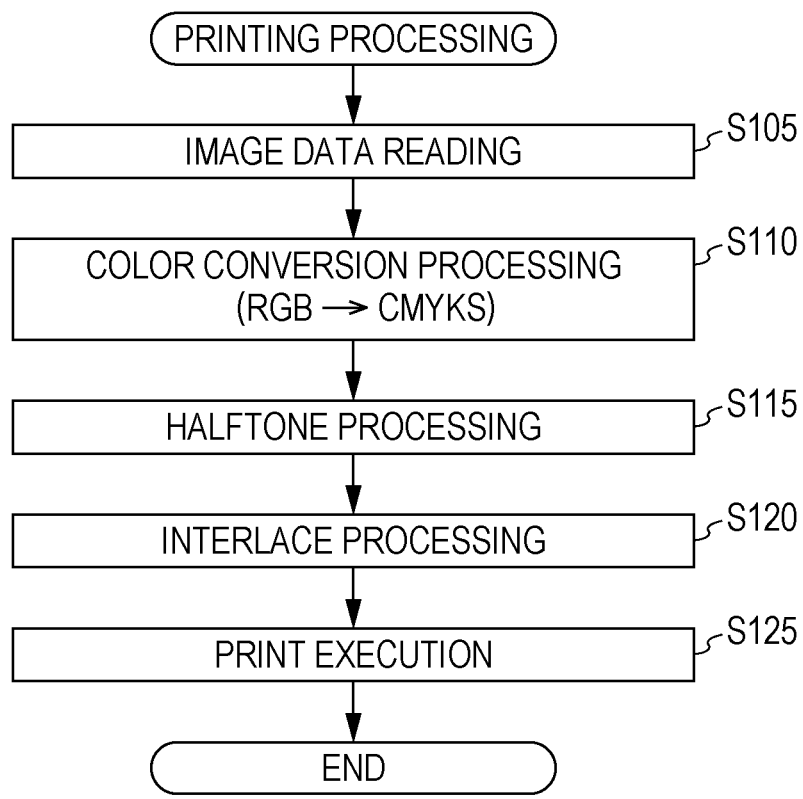
FIG. 2 is a flow chart of a printing processing in the present embodiment.

FIG. 2 is a flow chart of the printing processing in the present embodiment. When a user instructs the printing processing in an operation panel (not shown), the printing processing is started in the printer 20. The input portion 41 reads the image data ORG of the RGB type which is the print target from the memory card MC via the memory card slot 91 (step S105).

The color conversion portion 43 converts the image data ORG to image data of CMYKS type, which can be expressed by the printer 20, based on the LUT 62 memorized in the EEPROM 60 (step S110). In addition, the LUT 62 may be memorized in another memory medium, for example, a hard disk drive (not shown) included in the printer 20, and may be configured to be downloaded from a computer (not shown) connected to the printer 20.

The halftone processing portion 44 performs a halftone processing that converts the image data subjected to the color conversion processing to ON/OFF data of each color (step S115). As a specific method of the halftone processing, it is possible to adopt known methods, for example, an organizational dither method, an error diffusion method, a concentration pattern method or the like. The interlace processing portion 45 performs the interlace processing (step S120). When performing the interlace processing, the print control portion 46 drives the carriage motor 70, the paper transport motor 74, and the print head 81 based on the dot pattern data, discharges the metallic ink S and the color ink from the print head 81, and executes the metallic printing (step S125).

A3. LUT Creation Processing

Figure 3:
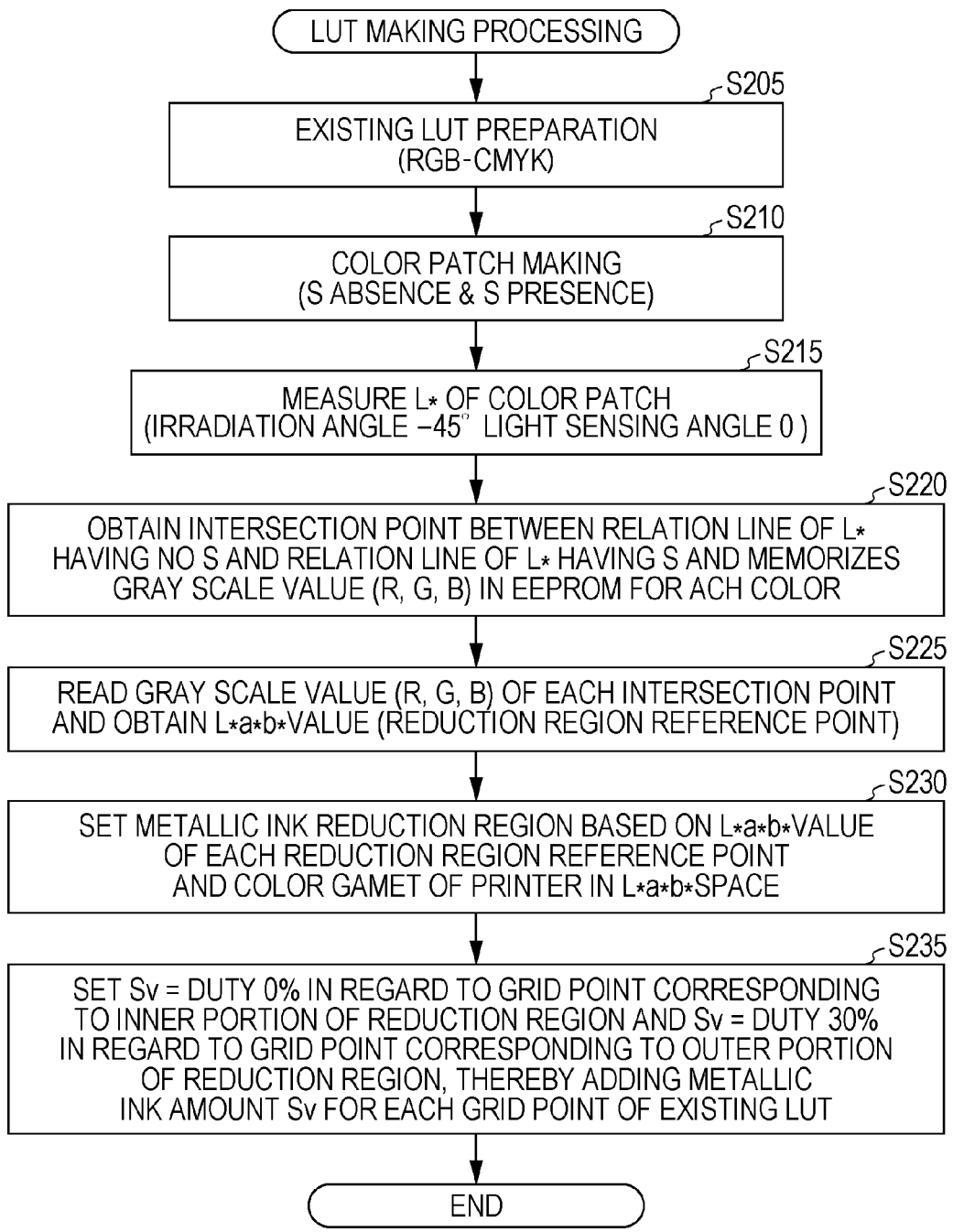
FIG. 3 is a flow chart that shows a wiring sequence of an LUT shown in FIG. 1.

FIG. 3 is a flow chart that shows a creation sequence of the LUT shown in FIG. 1. The creation of the LUT 62 can be executed before the shipping of the printer 20. Furthermore, the creation can be executed by a user during initial starting or at an arbitrary timing after the initial starting of the printer 20.

Firstly, the existing LUT for the printer 20 is prepared (step S205). The existing LUT means an LUT in which a corresponding relationship between an input value of the RGB and an input value of a CMYK type is written (that is, the output value of the metallic ink S is not written).

The LUT prepared herein is for superimposing the color ink on the metallic ink S and creating the LUT 62 for performing the printing. Thus, the LUT is created such that an ink duty limit value of the color ink is reduced by the superimposition of the metallic ink S, compared to a common LUT created under the condition that the metallic ink S is not included in the output value. The ink duty limit value of the color ink is an upper limit value of the color ink that can be discharged in a unit area of the print medium. In the ink jet printer, when discharging a large amount of ink in the unit area of the print medium, ink bleeding is generated and preferable color expression cannot be obtained, which thereby acts as a restriction. In addition, the ink duty limit values differ from each other depending on the print condition such as print medium or type of ink.

When preparing the existing LUT, next, a color patch not using the metallic ink S and a color patch using the metallic ink S are created (step S210). Herein, the color patch performs the color conversion processing of a predetermined color image subjected to the gradation change at a predetermined pitch by the use of the existing LUT mentioned above, and performs the printing by the printer 20. The color patch not using the metallic ink S is a color patch formed of only the color region, and is called a single color patch hereinafter. The color patch using the metallic ink S is a color patch in which the metallic ink S is superimposed on the single color patch by a predetermined duty, and is called a superimposed color patch hereinafter. The superimposition duty patch of the present embodiment is a patch in which the metallic ink S is superimposed by the ink duty of 30%.

Setting the ink duty of 30% is done because the metallic feeling expressed by the metallic ink S can be most easily visually recognized with an ink duty of 30% under the print conditions of the present embodiment, but the ink duty is not specifically limited thereto. The ink duty of the metallic ink S may be a basic setting value when superimposing the metallic ink S.

Furthermore, in the present embodiment, as mentioned above, the printing is performed by the printer 20 with the LUT 62 of the creation target mounted thereon and the color patch is created. This is because the performance of the LUT 62 created by a method stated later by creating the color patch by the condition using the LUT 62 is improved. However, the color patch necessarily does not need to be created using the printer 20.

Figure 4:
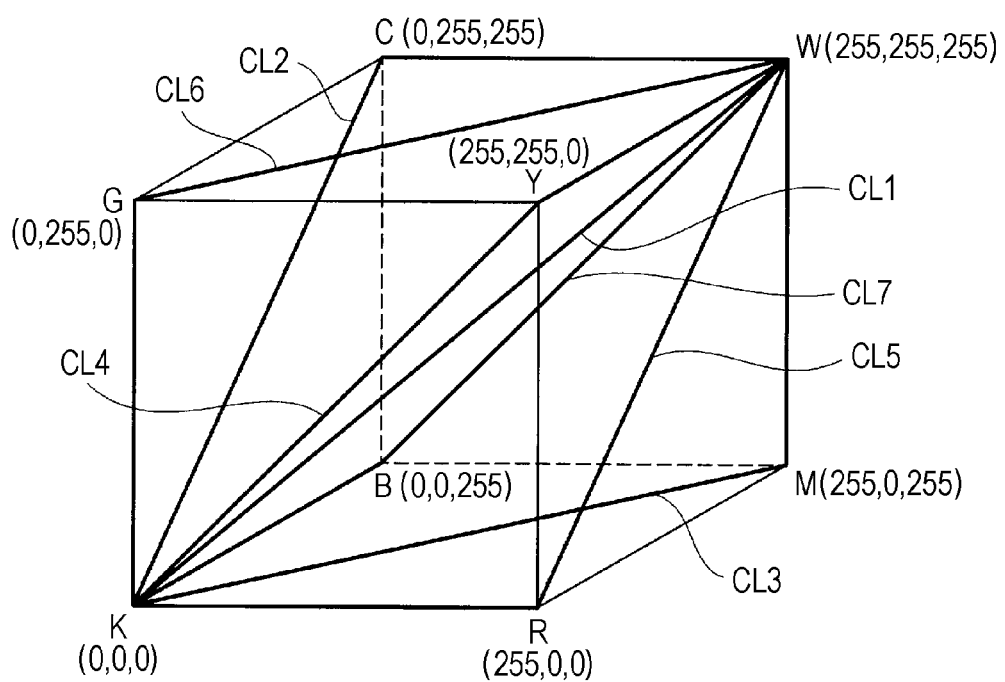
FIG. 4 is an explanatory diagram that schematically shows a RGB color space relating to an input value of a printer.

FIG. 4 is an explanatory diagram that schematically shows the RGB color space relating to the input value of the printer. As shown in FIG. 4, the RGB color space (the gradation value is 0 to 255) relating to the input value of the printer 20 is specified as the inner space of a cube having eight vertexes K (0, 0, 0), W (255, 255, 255), R (255, 0, 0), G (0, 255, 0), B (0, 0, 255), C (0, 255, 255), M (255, 0, 255), Y (255, 255, 0).

In the present embodiment, the predetermined colors of the color patch are a total of seven colors of a color line CL1 linearly connecting the vertex K with the vertex W, a color line CL2 linearly connecting the vertex K, the vertex C, and the vertex W, a color line CL3 linearly connecting the vertex K, the vertex M, and the vertex W, a color line CL4 linearly connecting the vertex K, the vertex Y, and the vertex W, a color line CL5 linearly connecting the vertex K, the vertex R, and the vertex W, a color line CL6 linearly connecting the vertex K, the vertex G, and the vertex W, and a color line CL7 linearly connecting the vertex K, the vertex B, and the vertex W. In addition, the color line CL1 connecting the vertex K with the vertex W is a so-called gray axis, and the color cannot be specified, but in the present embodiment, the color is adopted as "color having chroma of 0".

The color gradation change pitch of the color patch was configured such that each color line is divided into 32 steps, respectively. In the present embodiment, in any color line, the color gradation value 1 is W (255, 255, 255) and the color gradation value 32 is K (0, 0, 0).

When creating the color patch, as shown in FIG. 3, in regard to the single color patch and the superimposed color patch, the lightness (L*) of each color gradation is measured (step S215). In the present embodiment, L* was measured by setting the irradiation angle to 45° and the light receiving angle to 0°. However, the color measurement condition is not limited to such a condition but can be suitably set.

Next, the intersection point between the relation line of the gradation obtained by measuring the single color patch with a relation line of the gradation obtained by measuring the superimposed color patch is obtained and the gradation values (R, G, B) of the intersection point are memorized in the EEPROM 60 (step S220).

Figure 5:
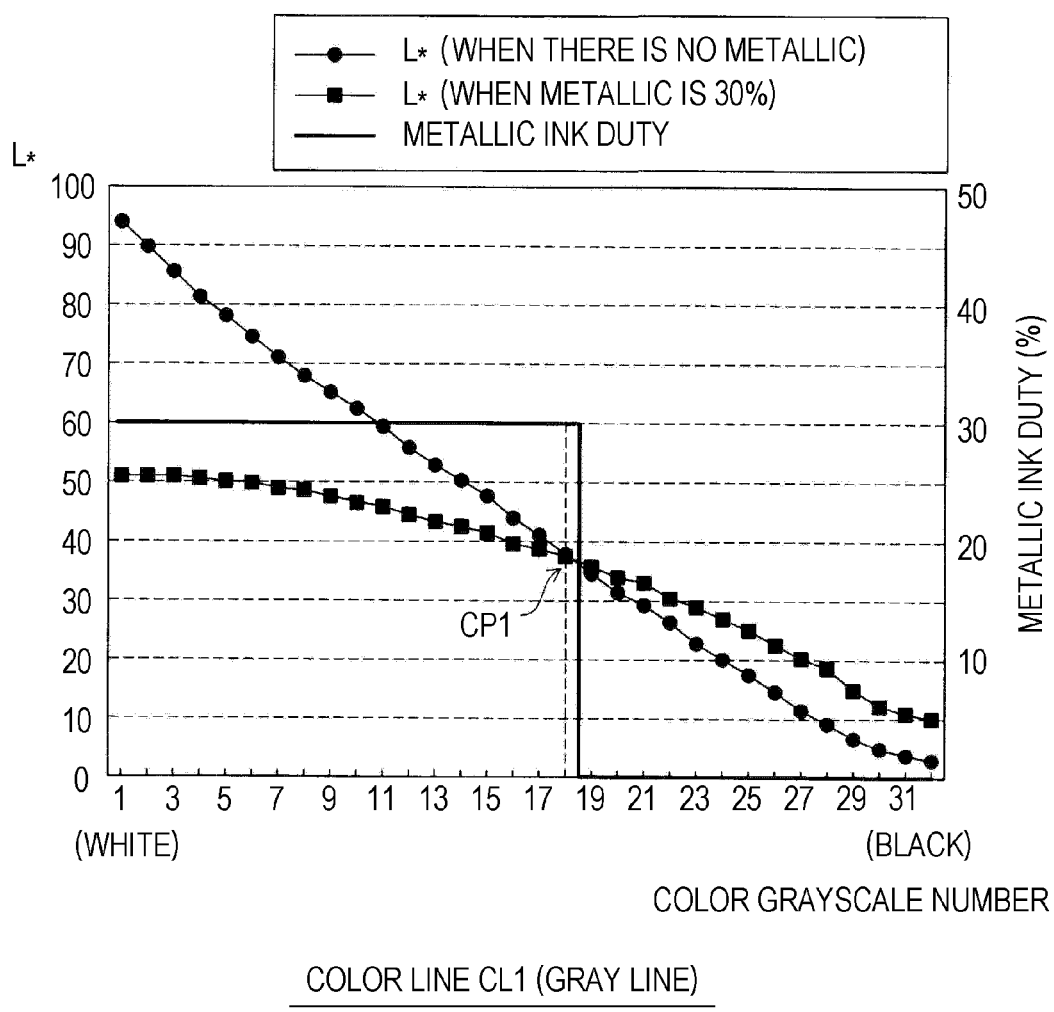
FIG. 5 is a diagram that shows a relationship between each color gradation of a single color patch and a superimposed color patch in a color line CL1 and L* measured in step S215.
Figure 6:
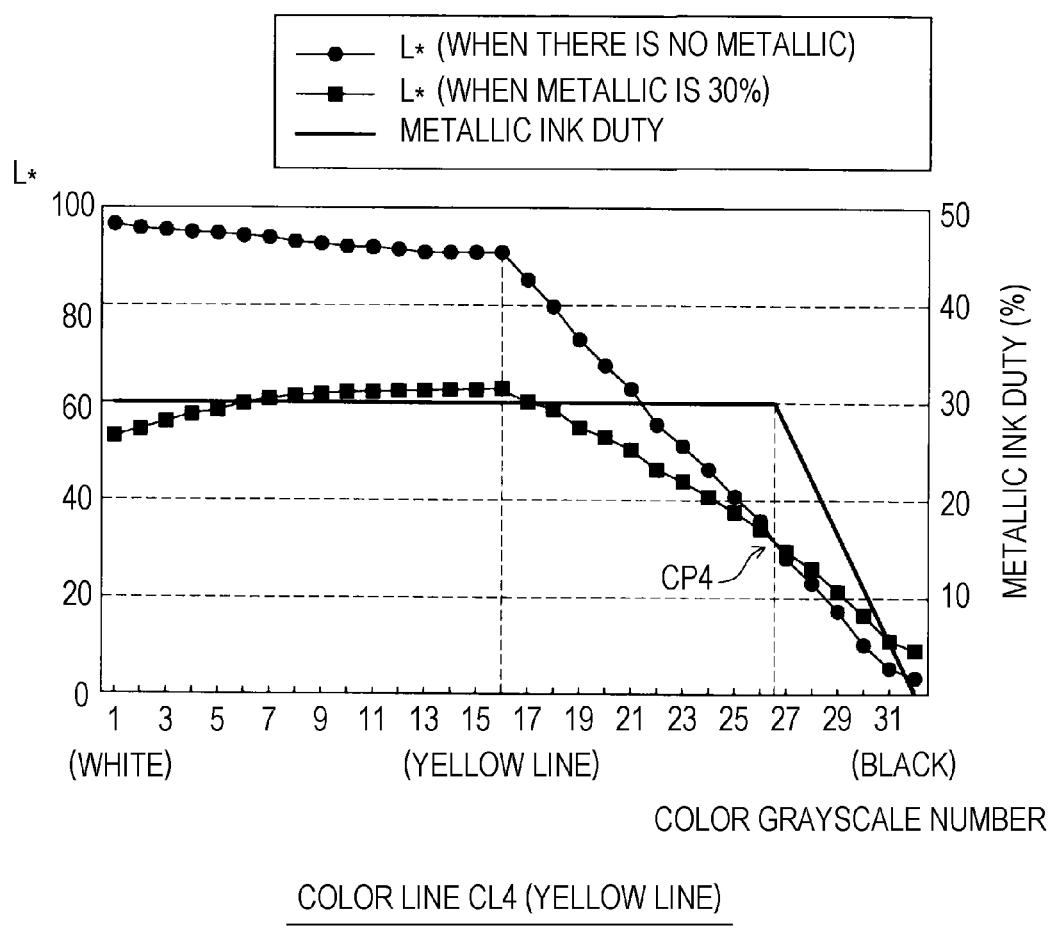
FIG. 6 is a diagram that shows a relationship between each color gradation of the single color patch and the superimposed color patch in the color line CL4 and L* measured in step S215.

FIG. 5 shows a relationship between each color gradation of the single color path ("when there is no metallic" in FIG. 5) and the superimposed color patch ("when the metallic is 30%" in FIG. 5) in the color line CL1 and L* measured in step S215. FIG. 6 shows a relationship between each color gradation of the single color path and the superimposed color patch in the color line CL4 and L* measured in step S215. In FIGS. 5 and 6, a transverse axis indicates the color gradation number, and a longitudinal axis indicates the lightness (L*) and the metallic ink duty (%). In addition, in FIGS. 5 and 6, thick solid lines indicate the metallic ink duty, but this is described later.

As shown in FIG. 5, in the color line CL1, it is understood that the relation line of the single color patch and the relation line of the superimposed color patch intersect with each other in the intersection point CP1 (the color gradation number 18). That is, in the dark portion side darker (blacker) than the color gradation number 18, the lightness of the case of the presence of the metallic ink is higher (brighter) than the lightness of the case of the absence of the metallic ink in the same color gradation. Thus, in the dark portion side darker (blacker) than the intersection point CP1, the color reproduction range (range of L*) of the case of the presence of the metallic ink is narrower than the color reproduction range of the case of the absence of the metallic ink. On the other hand, in a bright portion side brighter (whiter) than the color gradation number 18, the lightness of the case of the presence of the metallic ink is lower (darker) than the lightness of the case of the absence of the metallic ink in the same color gradation.

As shown in FIG. 6, in the color line CL4, it is understood that the relation line of the single color patch and the relation line of the superimposed color patch intersect with each other in the intersection point CP4 (the color gradation number 26). That is, at the dark portion side darker (blacker) than the color gradation number 26, the lightness of the case of the presence of the metallic ink is higher (brighter) than the lightness of the case of the absence of the metallic ink in the same color gradation. Accordingly, at the dark portion side darker than the intersection point CP2, the color reproduction range (range of L*) is narrower than the color reproduction range of the case of the absence of the metallic ink. On the other hand, at the bright portion side brighter (whiter) than the color gradation number 26, the lightness of the case of the presence of the metallic ink is lower (darker) than the lightness of the case of the absence of the metallic ink in the same color gradation number.

In this manner, in step S220, seven intersection points CP1 to CP7 for each color are obtained. The processing is performed by a user, and when the gradation values (R, G, B) of seven intersection points CP1 to CP7 obtained in step S220 are memorized in the EEPROM 60, the consecutive processing is executed.

The LUT creation portion 42 reads seven intersection points CP1 to CP7 from the EEPROM 60 and obtains the points "RP1 to RP7" (hereinafter, referred to as "reduction region reference points") corresponding to the respective intersection points CP1 to CP7 in the L*a*b* color space (step S225). As a method of obtaining the reduction region reference points RP1 to RP7, a known method of converting from the RGB color space to the L*a*b* color space can be used.

The LUT creation portion 42 sets the metallic ink reduction region based on the respective reduction region reference points RP1 to RP7 obtained in step S225 and the color gamut of the printer 20 (step S230). The metallic ink reduction region means a region where the amount of the metallic ink is reduced compared to other regions in the color reproduction region specified by the color gamut.

Figure 7:
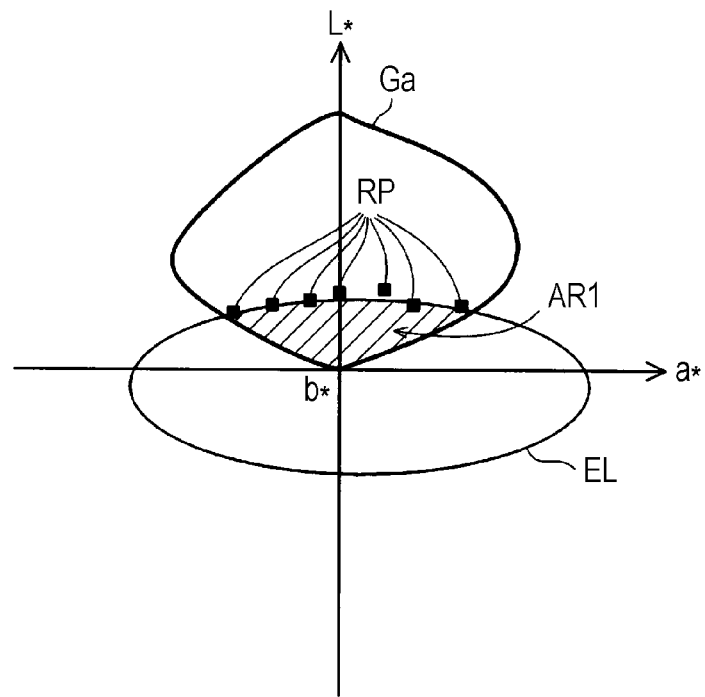
FIG. 7 is an explanatory diagram that schematically shows a method of setting a metallic ink reduction region in a first embodiment.

FIG. 7 is an explanatory diagram that schematically shows a metallic ink reduction region in the first embodiment. In FIG. 7, a transverse axis indicates an a* axis and a longitudinal axis indicates a L* axis. In addition, in FIG. 7, the L*a*b* space viewed on the b* axis is shown. In FIG. 7, the color gamut Ga indicates the color gamut in the L*a*b* color space. In FIG. 7, a region AR1 indicates a metallic ink reduction region AR1.

In the present embodiment, the metallic ink reduction region AR1 is set as below. Firstly, in the L*a*b* color space, an elliptical shape EL having a surface close to the respective reduction region reference points RP1 to RP7 is determined. Moreover, the superimposed portion between the inner portion of the elliptical shape EL and the color gamut Ga is set as the metallic ink reduction region AR1.

Figure 8:
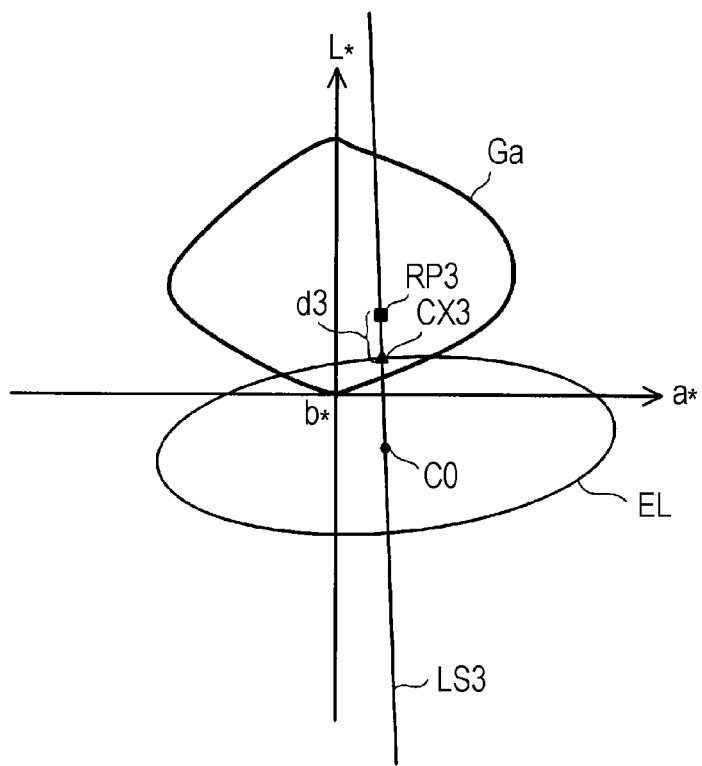
FIG. 8 is an explanatory diagram that schematically shows a method of determining an elliptical shape shown in FIG. 7.

FIG. 8 is an explanatory diagram that schematically shows a method of determining the elliptical shape shown in FIG. 7. In FIG. 8, a transverse axis and a longitudinal axis are the same as the transverse axis and the longitudinal axis in FIG. 7. In FIG. 8, a point C0 indicates a center point C0 of the elliptical shape EL. Furthermore, the point RP3 indicates one reduction region reference point RP3.

The elliptical shape EL can be, for example, set as below. Firstly, the elliptical shape EL is defined by coordinates (L* value, a* value, and b* value) of the center point C0, three radiuses along three space axes, and the respective three rotation angles from the L* axis, the a* axis, and the b* axis, thereby determining straight lines LS1 to LS7 connecting the center point C0 with the respective reduction region reference points RP1 to RP7. Next, after obtaining intersection points CX1 to CX7 between the respective straight lines LS1 to LS7 and the color gamut Ga, distances d1 to d7 between the respective intersection points CX1 to CX7 and the respective reduction region reference points RP1 to RP7. Moreover, by changing the respective parameters defining the elliptical shape EL (the coordinates of the center line C0, the three radiuses, and the three rotation angles) to obtain the respective distances d1 to d7, the respective parameters having the smallest average value (the average distance) of the respective distances d1 to d7 are determined by the fitting.

In an example of FIG. 8, the straight line LS3 connecting the center line C0 with the reduction region reference point RP3 is determined, and an intersection point CX3 between the straight line LS3 and the color gamut Ga is obtained. Moreover, the respective parameters defining the elliptical shape EL are determined such that the average distance including the reference distance d3 between the intersection point CX3 and the reduction region reference point RP3 is the smallest distance.

When the elliptical shape EL is determined, the LUT creation portion 42 memorizes the respective parameters of the elliptical shape EL in the EEPROM 60 together with the profile data of the color gamut Ga, and the setting of the metallic ink reduction region AR1 is finished.

As mentioned above, determining the metallic ink reduction region AR1 based on the reduction region reference points RP1 to RP7 corresponding to the intersection points CP1 to CP7 obtained in step S220 is based on the reason below. As shown in FIG. 5, considering the color line CL1, as mentioned above, by setting the intersection point CP1 as a boundary, at the bright portion side (white side), L* in the case of the absence of the metallic ink is greater (that is, brighter) than L* of the case of the presence of the metallic ink. Thus, if the metallic ink reduction region AR1 is determined based on the point in the L*a*b* color space corresponding to the point of the color gradation in which L* is higher than the intersection point CP1, a phenomenon (hereinafter, referred to as "a lightness reversal phenomenon") is generated in which, regardless of the color gradation approaching black, L* is increased, and there is a possibility that the soft gradation change of L* (lightness) cannot be expressed. Furthermore, when determining the metallic ink reduction region AR1 based on the point in the L*a*b* color space corresponding to the point of the color gradation in which L* is lower than the intersection point CP1, the reproduction color range is narrower than the case of determining the metallic ink reduction region AR1 based on the reduction region reference point RP1 corresponding to the intersection point CP1.

Furthermore, as mentioned above, setting the metallic ink reduction region AR1 using the elliptical shape EL is done because the slope (a degree of change) of the surface is soft and a rapidly changed portion does not exist, for example, because it is possible to avoid cases where boundaries (lightness), in which an amount of metallic ink is reduced, extremely differ from each other between the adjacent colors. In addition, in the elliptical shape EL, since the number of the parameters used during fitting is relatively great, for example, nine (the coordinates of the center point C0, the three radiuses, and the three rotation angles), it is possible to determine the metallic ink reduction region having the surface close to the respective reduction region reference points RP1 to RP7.

When the setting (step S230) of the metallic ink reduction region is finished, the LUT creation portion 42 determines whether or not the respective grid points of the existing LUT are included in the metallic ink reduction region AR1 set in step S230, an ink duty=30% is set as a metallic ink amount Sv in the grid point not included in the metallic ink reduction region AR1, an ink duty=0% is set as a metallic ink amount Sv in the grid point included in the metallic ink reduction region AR1, and each set metallic ink amount Sv is added to each grid point of the existing LUT (step S235).

Figure 9A:
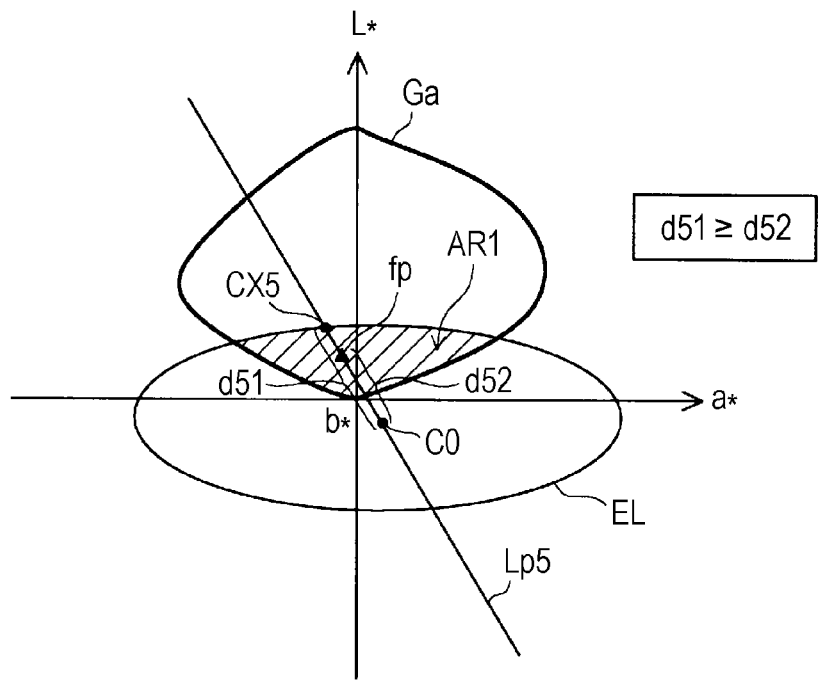
FIGS. 9A and 9B are explanatory diagrams that schematically show a method of determining whether or not a grid point of the existing LUT is included in a metallic ink reduction region.
Figure 9B:
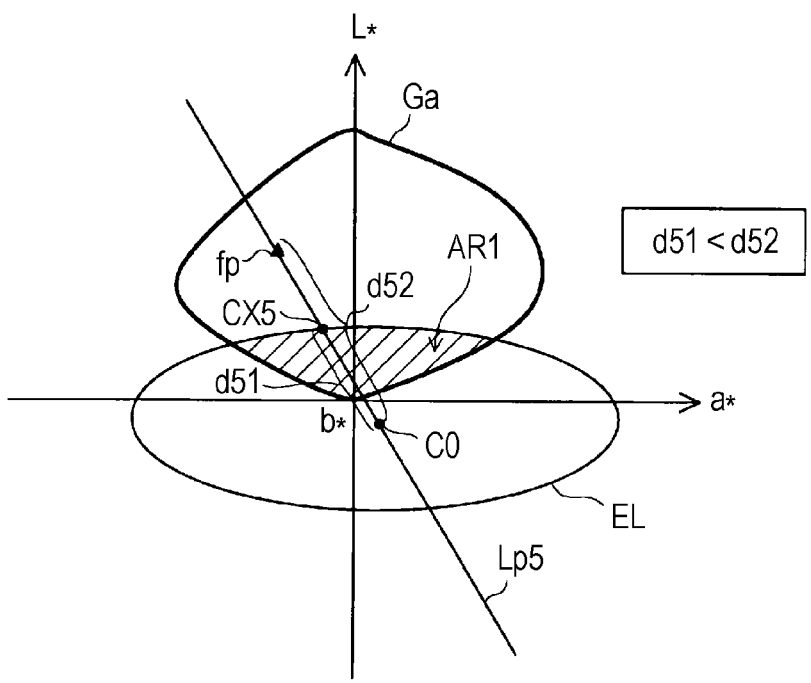

FIGS. 9A and 9B are explanatory diagrams that schematically show a method of determining whether or not the grid point of the existing LUT is included in the metallic ink reduction region. In FIGS. 9A and 9B, FIG. 9A indicates a case where the grid point is included in the metallic ink reduction region AR1, and FIG. 9B indicates a case where the grid point is not included in the metallic ink reduction region AR1. In addition, in FIGS. 9A and 9B, the transverse axis and the longitudinal axis are the same as the transverse axis and the longitudinal axis in FIGS. 7 and 8.

As the method of determining whether or not the grid point of the existing LUT is included in the metallic ink reduction region, for example, a method can be adopted as follows. Firstly, the grid points (R, G, B) of the existing LUT are converted to the coordinates on the L*a*b* color space, and grid points fp (L*, a*, b*) on the L*a*b* color space are determined. Next, after obtaining a straight line Lp5 connecting the grid point fp with the center line C0 of the elliptical shape EL, an intersection point CX5 between the straight line Lp5 and the color gamut Ga is obtained. Moreover, a distance d51 between the center point C0 and the intersection point CX5 is compared to a distance d52 between the center point C0 and the grid point fp, when the distance d51 is equal to or greater than the distance d52, as shown in FIG. 9A, it is determined that the grid point fp is included in the metallic ink reduction region AR1. On the other hand, as shown in FIG. 9B, when the distance d51 is smaller than the distance d52, it is determined that the grid point fp is not included in the metallic ink reduction region AR1.

As mentioned above, in regard to the grid point not included in the metallic ink reduction region AR1, setting the ink duty=30% as the metallic ink amount Sv is done because the metallic feeling expressed by the metallic ink S can be most easily visually recognized at the ink duty of 30% under the print conditions of the present embodiment; however, the ink duty is not limited thereto.

According to the LUT 62 created by the LUT creation processing mentioned above, for example, as indicated by a thick solid line of FIG. 5, in regard to the color line CL1, the metallic ink amount Sv (the ink duty) is 0% in the grid point of the dark portion side darker than the grid point corresponding to 18.5 by the color gradation number and the metallic ink amount Sv (the ink duty) is 30% in the grid point of the bright portion side. In addition, the fact that 18 as the color gradation number of the intersection point CP1 is not a boundary is because the boundary (the surface of the elliptical shape EL) of the metallic ink reduction region AR1 is determined so as not pass through the reduction region reference point RP1 corresponding to the intersection point CP1. Furthermore, as shown by a thick solid line of FIG. 6, in regard to the color line CL4, the metallic ink amount Sv (the ink duty) is 0% in the grid point of the dark side portion darker than the grid point corresponding to 26.5 by the color gradation number, and the metallic ink amount Sv (the ink duty) is 30% in the grid point of the bright portion side.

Figure 10:
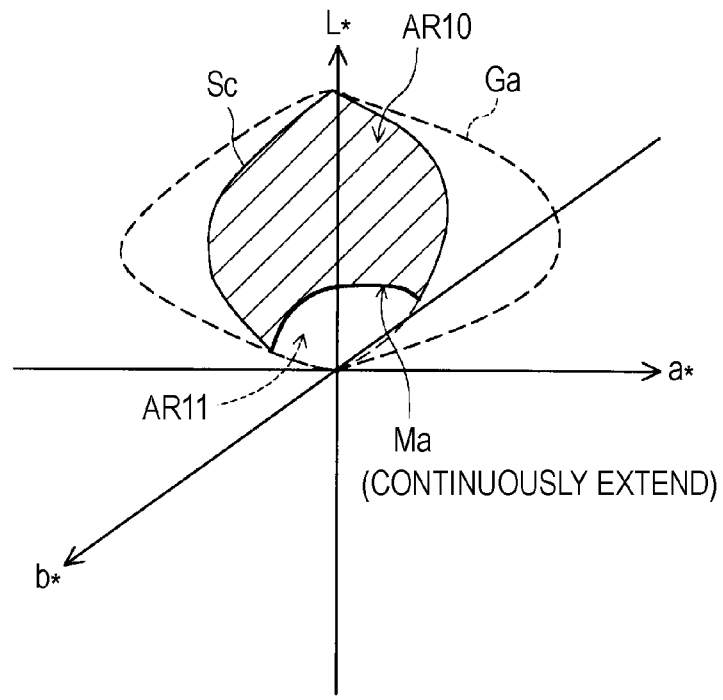
FIG. 10 is an explanatory diagram that schematically shows a metallic ink amount that is observed on a print medium in the case of printing an image obtained by performing a color conversion using LUT.

FIG. 10 is an explanatory diagram that schematically shows the metallic ink amount observed on a print medium P when printing an image obtained by performing a color conversion using an LUT. The printer 20 prints each color included in a certain cross section Sc including the L* axis in the color gamut Ga, and in an example of FIG. 10, the metallic ink amount (a dot recording rate) in the respective printed color is mapped and shown in the positions corresponding to each color on the L*a*b* color space. As shown in FIG. 10, in the cross section Sc, a region AR10 having a relatively large metallic ink amount (the metallic ink amount is not 0) and a region AR11 having a relatively small metallic ink amount (the metallic ink amount is 0) are shown. Moreover, a boundary Ma between two regions AR10 and AR11 has a continuously lined shape.

As mentioned above, in the printer 20 of the first embodiment, the LUT 62, which is set such that the metallic ink amount Sv in the grid point included in the metallic ink reduction region AR1 is smaller than the metallic ink amount Sv in the grid portion not included in the metallic ink reduction region AR1, is used in the color conversion. Herein, the metallic ink reduction region AR1 is set in the dark portion side (a region having a relatively small L* value) in the L*a*b* color space. Thus, by performing the color conversion using the LUT 62, it is possible to reduce the metallic ink amount implanted to the pixel included in the metallic ink reduction region AR1 in the L*a*b* color space further than the metallic ink amount implanted to the pixel included in the metallic ink reduction region AR1. Thus, in the dark portion region of the image, the color ink amount can be further increased, and the gradation reproducibility can be improved. In addition, in the reduction region reference points RP1 to RP7 referred to upon determining the metallic ink reduction region AR1, the L* is determined based on the intersection points CP1 to CP7 by which the relation line of the single color patch and the relation line of the superimposed color patch intersect with each other in the respective color lines CL1 to CL7. Thus, it is possible to suppress the generation of the reversal phenomenon of the lightness.

Furthermore, since the metallic ink reduction region AR1 is set using the elliptical shape EL, the boundary surface of the metallic ink reduction region AR1 can be smoothly formed. Thus, for example, it is possible to avoid cases where the boundaries (the brightness), where the metallic ink amount is reduced, are extremely different from each other between the adjacent colors. Furthermore, since the elliptical shape EL is defined using many parameters, a degree of freedom when fitting can be increased. Thus, it is possible to set the metallic ink reduction region AR1 having the close surface by the respective region reference points RP1 to RP7.

Furthermore, since the metallic ink reduction region AR1 is defined in the L*a*b* color space, that is, the three-dimensional color space, a relative easy determination is possible. Furthermore, since the metallic ink reduction region AR1 is set in the L*a*b* color space which is the device-independent color space, it is possible to set the reduction region of the metallic ink in a suitable range in the RGB color space of the LUT 62.

Furthermore, in regard to the pixel corresponding to the grid point included in the metallic ink reduction region AR1, by not implanting the S metallic ink amount Sv (set such that the duty=0%), the consumption of the metallic ink amount can be greatly suppressed, whereby the running costs associated with the printing can be greatly reduced.

B. Second Embodiment

Figure 11:
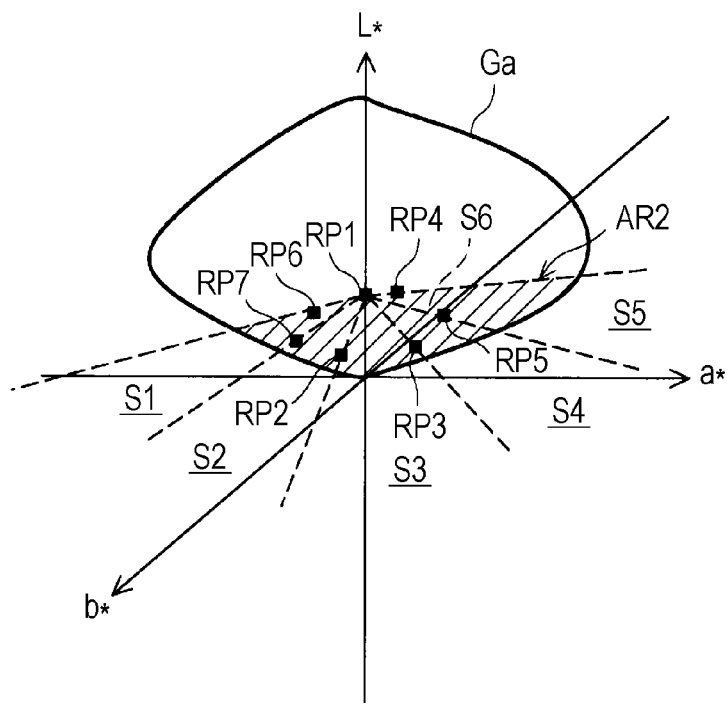
FIG. 11 is an explanatory diagram that schematically shows a method of setting a metallic ink reduction region in a second embodiment.

FIG. 11 is an explanatory diagram that schematically shows a method of setting the metallic ink reduction region in a second embodiment. In FIG. 11, a transverse axis and a longitudinal axis are the same as the transverse axis and the longitudinal axis in FIG. 7. In addition, in FIG. 11, unlike FIG. 7, an L*a*b* color space seen from the viewpoint shifted from the b* axis is shown. A printer of the second embodiment is different from the printer 20 of the first embodiment in the setting method of the metallic ink reduction region, and other configurations thereof are the same as the first embodiment. In addition, in FIG. 11, the reduction region reference points RP1 to RP7 are the same as the reduction region reference points RP1 to RP7 of the first embodiment.

In the second embodiment, the metallic ink reduction region AR2 is set as below. Firstly, the reduction region reference point RP1 corresponding to the intersection point CP1 in the color line CL1 (the gray axis) resembles a monopod portion of an umbrella, and a plane specified by two reduction region reference points determined in two adjacent colors (the color lines) is determined by setting the reduction region reference point RP1 as a vertex. As a result, six planes are determined and each plane has a triangular shape. Moreover, the umbrella shape formed by such a plane is determined, the superimposed portion between the inner portion of the umbrella shape and the color gamut Ga is set as the metallic ink reduction region AR2. In addition, the reduction region reference point RP1 in the present embodiment corresponds to the specific reference point in the claims.

In the example of FIG. 11, a plane S1 passing through two reduction region reference points RP6 and RP7 by setting the reduction region reference point RP1 as a vertex is set in the L*a*b* color space. Similarly, a plane S2 passing through two reduction region reference points RP7 and RP2 by setting the reduction region reference point RP1 as the vertex, a plane S3 passing through two reduction region reference points RP2 and RP3 by setting the reduction region reference point RP1 as the vertex, a plane S4 passing through two reduction region reference points RP3 and RP5 by setting the reduction region reference point RP1 as the vertex, a plane S5 passing through two reduction region reference points RP5 and RP4 by setting the reduction region reference point RP1 as the vertex, and a plane S6 passing through two reduction region reference points RP4 and RP6 by setting the reduction region reference point RP1 as the vertex are set in the L*a*b* color space, respectively. In the respective planes S1 to S6, two adjacent planes are in contact with each other. Moreover, in the example of FIG. 11, the superimposed portion between the umbrella-shaped inner portion formed by the respective planes S1 to S6 and the color gamut Ga is set as the metallic ink reduction region AR2.

Figure 12A:
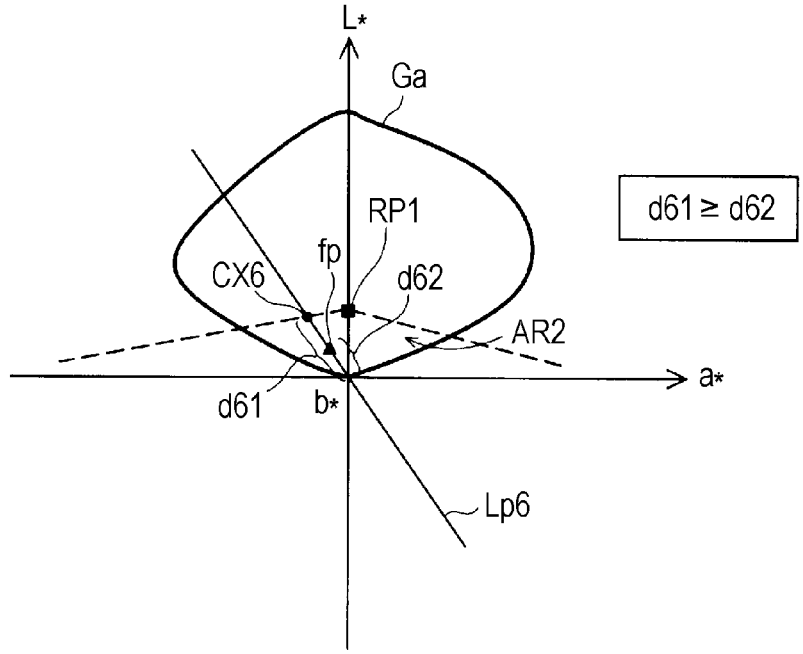
FIGS. 12A and 12B are explanatory diagrams that schematically show a method of determining whether or not a grid point of the existing LUT in a second embodiment is included in a metallic ink reduction region.
Figure 12B:
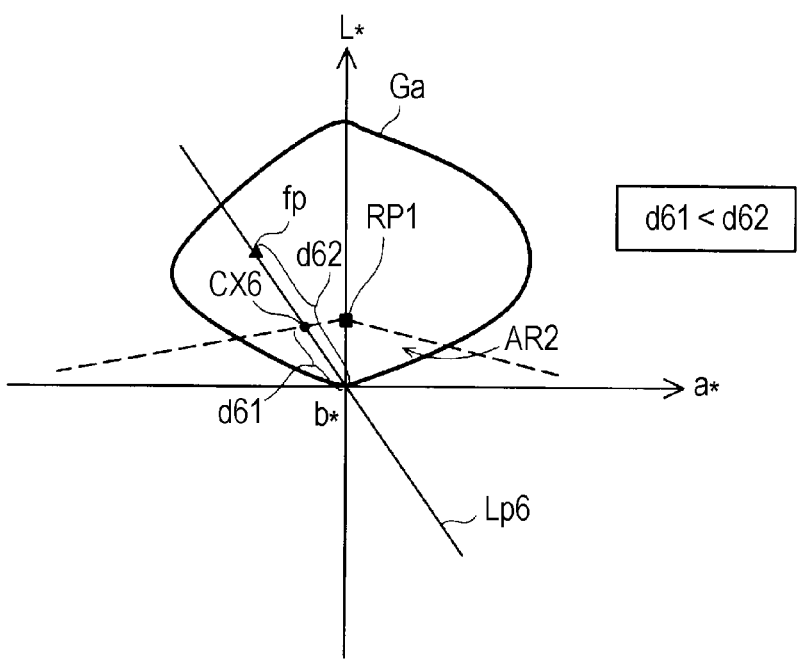

FIGS. 12A and 12B are explanatory diagrams that schematically show a method of determining whether or not the grid point of the existing LUT in the second embodiment is included in the metallic ink reduction region. In FIGS. 12A and 12B, FIG. 12A indicates a case where the grid point is included in the metallic ink reduction region AR2, and FIG. 12B indicates a case where the grid point is not included in the metallic ink reduction region AR2. In addition, in FIGS. 12A and 12B, the transverse axis and the longitudinal axis are the same as the transverse axis and the longitudinal axis in FIGS. 9A and 9B.

In the second embodiment, as the method of determining whether or not the grid point of the existing LUT is included in the metallic ink reduction region, for example, a method can be adopted as follows. Firstly, the grid points (R, G, B) of the existing LUT are converted to the coordinates on the L*a*b* color space, and grid points fp (L*, a*, b*) on the L*a*b* color space are determined. After obtaining a straight line Lp6 connecting the grid point fp with the origin (0, 0, 0), an intersection point CX6 between the straight line Lp6 and the color gamut Ga is obtained. Moreover, a distance d61 between the origin and the intersection point CX6 is compared to a distance d62 between the origin and the grid point fp, when the distance d61 is equal to or greater than the distance d62, as shown in FIG. 12A, it is determined that the grid point fp is included in the metallic ink reduction region AR2. On the other hand, as shown in FIG. 12B, when the distance d61 is smaller than the distance d62, it is determined that the grid point fp is not included in the metallic ink reduction region AR2.

The printer of the second embodiment having such a configuration has the same effect as the printer 20 of the first embodiment. In addition, since the metallic ink reduction region AR2 includes the respective reduction region reference points RP1 to RP7, in the respective color lines CL1 to CL7, the respective intersection points CP1 to CP7 can be situated in the boundary in which the metallic ink amount Sv is in the duty from 30% to 0%. Thus, it is possible to suppress the occurrence of the lightness reversal phenomenon at least in each color line with a higher probability.

C. Third Embodiment

Figure 13:
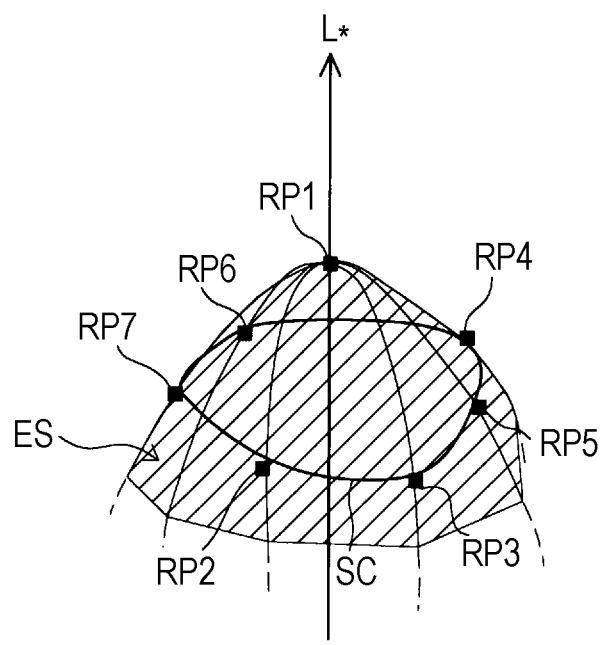
FIG. 13 is an explanatory diagram that schematically shows a method of setting a metallic ink reduction region in a third embodiment.

FIG. 13 is an explanatory diagram that schematically shows a method of setting the metallic ink reduction region in the third embodiment. In FIG. 13, for convenience of the illustration, only L* axis in the L*a*b* color space is shown. The printer of the third embodiment is different from the printer 20 of the first embodiment in the setting method of the metallic ink reduction region, and in other respects the configuration is the same as that of the first embodiment. In addition, in FIG. 13, the reduction region reference points RP1 to RP7 are the same as the reduction region reference points RP1 to RP7 of the first embodiment shown in FIG. 7.

In the third embodiment, the metallic ink reduction region is set as below. Firstly, an annular periodic spline curve SC close to the respective reduction region reference points RP2 to RP6 is obtained using the coordinates of other six reduction region reference points RP2 to RP6 except for the reduction region reference points RP1. The periodic spline curve SC can be calculated using a known spline function. Next, a shape ES as the set of the secondary curve is determined which is a set which is an arbitrary point on the periodic spline curve SC and passes through the reduction region reference point RP1 as the vertex, and a superimposed portion between the inner portion of the shape ES and the color gamut Ga is set as the metallic ink reduction region. In addition, in FIG. 13, the color gamut Ga and the metallic ink reduction region are omitted.

As the setting method of the metallic ink reduction region, instead of the aforementioned method, for example, the shape of the set of the secondary curve, which passes through two other arbitrary reduction region reference points by setting the reduction region reference point RP1 as the vertex, is determined, and the shape can also be set as the superimposed portion between the inner portion of the shape and the color gamut Ga. In other words, it is possible to set the superimposed portion of the inner portion of the shape, which is specified by the secondary curve passing through the reduction region reference point RP1 and another arbitrary reduction region reference point (a first reduction region reference point) and the secondary curve passing through the reduction region reference point RP1 and another arbitrary reduction region reference point (a second reduction region reference point) different from the first reduction region reference point and the reduction region reference point RP1, and the color gamut Ga as the metallic ink reduction region. In addition, in the third embodiment, since the method of determining whether or not the grid point of the existing LUT is included in the metallic ink reduction region is the same as the second embodiment, the description thereof will be omitted.

The printer of the third embodiment having such a configuration has the same effect as the printer 20 of the first embodiment.

D. Modified Example

In addition, elements other than elements claimed in an independent claim among the components in the respective embodiments are additional elements, and can suitably be omitted. Furthermore, the present invention is not limited to the embodiments mentioned above, but can be embodied in various forms in the scope not departing from the gist thereof, and the modifications below are also possible.

D1. Modified Example 1

In the respective embodiments, the application of the invention to the printer was described as an example, but the present invention is not limited thereto. For example, the invention can also be applied to a computer connected to the printer. FIG. 14 is an explanatory diagram that shows an application example regarding the computer of the invention in modified example 1.

In FIG. 14, a computer 100 is connected to a printer 20a. In addition, the printer 20a is configured so as to be printed using the color ink and the metallic ink like the printer 20 of the first embodiment.

A predetermined operating system is installed in the computer 100, and an application program 120 is operated under the operating system. A printer driver 110 is incorporated in the operating system. The application program 120 inputs the image data ORG from the digital camera 200, for example, through a peripheral device interface (not shown). Then, the application program 120 outputs the image data ORG to the printer 20a via the printer driver 110. In addition, the image data ORG is image data of RGB type like the image data ORG in the respective embodiments.

The printer driver 110 includes an LUT creation module 111, a color conversion module 112, a halftone processing module 113, an interlace processing module 114, and an LUT 115.

The LUT creation module 111 has the same function as the LUT creation portion 42 of the first embodiment shown in FIG. 1. Furthermore, the color conversion module 112 has the same function as the color conversion portion 43 shown in FIG. 1, the halftone processing module 113 has the same function as the halftone processing portion 44 shown in FIG. 1, and the interlace processing module 114 has the same function as the interlace processing portion 45 shown in FIG. 1, respectively.

In the computer 100 (the printer driver 110) having such a configuration, the aforementioned LUT creation processing is executed. Thus, the LUT 115 has the same setting contents as the LUT 62 of the first embodiment shown in FIG. 1. Therefore, when the printing is executed in the printer 20a based on the image data after the color conversion using the LUT 115, the gradation reproducibility can be improved in the dark portion region in the image, and thus the same effect as the printer 20 of the first embodiment can be exhibited. In addition, the computer 100 (the printer driver 110) in the modified example 1 mentioned above corresponds to the print device control device in the claims. The invention can also be applied to the color conversion method, the color conversion program, the recording medium, the color converting LUT, the creation method of the color converting LUT, the printed matter or the like, without being limited to the printer and the computer (the printer driver) mentioned above.

D2. Modified Example 2

In the respective embodiments, in regard to the grid point included in the metallic reduction region, a fixed value (the ink duty=0%) is set as the metallic ink amount Sv, but the invention is not limited thereto.

Figure 15A:
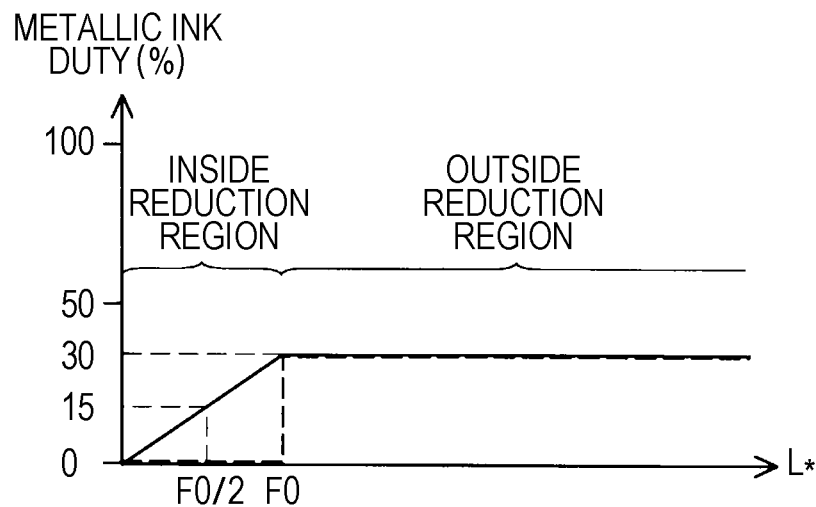
FIGS. 15A and 15B are explanatory diagrams that schematically show a method of setting the metallic ink amount in a grid point included in a metallic ink reduction region in a second modified example.
Figure 15B:
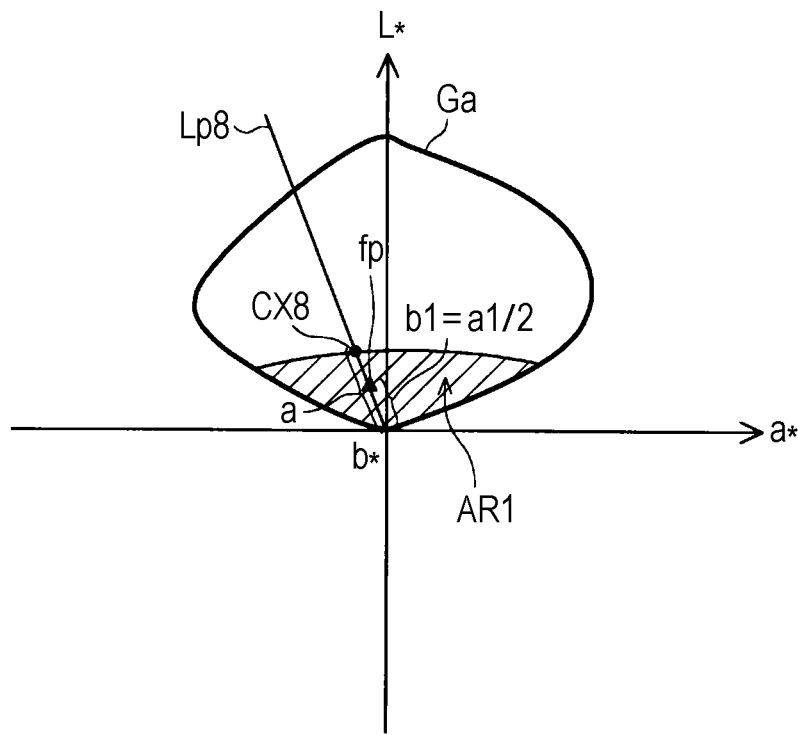

FIGS. 15A and 15B are explanatory diagrams that schematically show the method of setting the metallic ink amount to the grid point included in the metallic ink reduction region in modified example 2. In FIGS. 15A and 15B, FIG. 15A indicates a relationship between the L* of each grid point and the metallic ink amount Sv (the duty), and FIG. 15B schematically indicates a method of determining the metallic ink amount Sv as an example of one grid point fp. In addition, in FIG. 15A, the L* of each grid point in the first embodiment and the metallic ink amount Sv (the duty) is indicated by a dotted line.

In the modified example 2, as shown in FIG. 15A, in regard to the grid point included in the metallic ink reduction region, unlike the first embodiment, a fixed value is not set as the metallic ink amount Sv. Specifically, in regard to the grid point included in the metallic ink reduction region, the metallic ink amount Sv is set such that L* and the metallic ink amount Sv are made linearly proportional to each other by setting 30% as the upper limit.

For example, as shown in FIG. 15B, when an intersection point between a straight line Lp8 connecting some grid point fp with the origin of the L*a*b* color space and the metallic ink reduction region AR1 is an intersection point CX8, a lightness difference between the origin and the intersection point CX8 corresponds to a lightness difference (that is, F0) between the origin (the lightness 0) in FIG. 15A and F0 which is L* of the boundary between a region having the increased metallic ink amount Sv and a region where the metallic ink amount Sv is regular at the duty=30%. Thus, for example, as indicated in FIG. 15B, when the distance b1 between the origin and the grid point fp is a half of a distance a1 between the origin and the intersection point CX8, as indicated in FIG. 15A, "15%", in which L* is the duty in the F0/2, is set as the metallic ink amount Sv of the grid point fp.

Even in such a configuration, the same effect as the respective embodiments can be exhibited. In addition, as indicated in FIG. 15A, in the range of the value of L* from 0 to F0, instead of the configuration in which the L* and the metallic ink amount Sv (the ink duty) are in the linear proportional relationship, it is possible to adopt a configuration having a configuration in which L* and the metallic ink amount Sv have an arbitrary relationship, such as a relationship in which the metallic ink amount Sv is exponentially increased together with an increase in L*. In addition, even in regard to the grid point that is not included in the metallic ink reduction region AR1, an arbitrary value can be set as the fixed value, without being limited to 30%. For example, in the grid point, it is also possible to adopt a configuration in which the fixed value of 35% is set, or a configuration in which the metallic ink amount Sv is set to be great according to an increase in L*.

D3. Modified Example 3

In the respective embodiments, the LUT 62 used in the color conversion was a three-dimensional LUT in which RGB are converted to CMYKS, but the invention is not limited thereto. For example, it is possible to adopt a multidimensional LUT such as a four-dimensional LUT in which CMYK are converted to CMYKS. As mentioned above, in the respective embodiments, the metallic ink reduction region is determined in the L*a*b* color space, that is, the three-dimensional color space, and the metallic ink reduction region is reflected to the existing LUT. Thus, even when the LUT to be created is an arbitrary multidimensional LUT, since the metallic ink reduction region is determined in the L*a*b* color space which is the three-dimensional space in which it is relatively easy to define the region, it is possible to easily set the grid point that reduces the metallic ink in the LUT.

D4. Modified Example 4

In the respective embodiments, the metallic ink reduction region was set in the L*a*b* color space. However, the metallic ink reduction region may be set in an arbitrary device-independent color space such as a L*C*h color space or XYZ color space, instead of the L*a*b* color space. Furthermore, a configuration was indicated in which, when the color lightness (L*) expressed by the color ink is equal to or less than a predetermined value, the amount of the metallic ink S used is reduced. However, as an index as to whether or not the amount of the metallic ink S used is reduced, various values relating to the color brightness expressed by the color ink can be used as the index, without being limited to the lightness. For example, luminance, ink duty or the like can be adopted as the index.

D5. Modified Example 5

In the first embodiment, upon determining the elliptical shape EL, it is possible to add a condition in which a value of L* of the center point C0 of the elliptical shape EL is a negative value. In a case where the value of L* of the center point C0 is positive, when the radius of L* direction of the elliptical shape EL is small, a region can be generated where the elliptical shape EL does not exist near the lower stage of the color gamut Ga and the color gamut Ga is not superimposed on the inner portion of the elliptical shape EL. In this case, since L* does not correspond to the metallic ink reduction region AR1 in spite of having the small value, a pixel exists where the duty=30% is set as the metallic ink amount Sv, whereby the lightness reversal phenomenon may be generated. Thus, by adding a condition in which the value of L* of the center point C0 of the elliptical shape EL is a negative value, the occurrence of the lightness reversal phenomenon can be suppressed.

D6. Modified Example 6

In the respective embodiments, the intersection points CP1 to CP7 used for determining the metallic ink reduction region by measuring the color patch, but the color measurement is not required but may be omitted. However, like the embodiment, if the color measurement is performed to determine the reduction point of the metallic ink S, the lightness reversal phenomenon can reliably be suppressed, and thus is of course more desirable.

D7. Modified Example 7

In the respective embodiments, the printer 20 was an ink jet printer, but, instead of this, it is possible to adopt a laser printer that attaches the glossy toner and the color toner on the print medium to perform the printing. Furthermore, it is also possible to adopt various glossy inks expressing textures other than the coloring such as ink containing a pigment expressing gloss similar to pearl gloss, instead of the metallic ink.

D8. Modified Example 8

In step S235 of the LUT creation processing of the respective embodiment, the metallic ink amount Sv is added to the grid point belonging to the metallic ink reduction region. However, instead of this, in the grid point not belonging to the metallic ink reduction region, the color ink amount (the duty) can be changed. As mentioned above, the existing LUT, which is based on the time of creating the LUT 62, is an LUT that is created by reducing the ink duty limit value of the color ink as the metallic ink S is superimposed. Thus, in the grid point not belonging to the metallic ink reduction region, color is converted to color in which the color ink amount is reduced compared to a case where the color conversion is performed using a common LUT during color conversion. Thus, in the grid point not belonging to the metallic ink reduction region, it is desirable to reduce the color ink amount (the duty). In addition, in contrast to this, it is possible to adopt a configuration in which, as the LUT that becomes the base when creating the LUT 62, a common LUT is used which does not reduce the ink duty limit value of the color ink, and in the grid point belonging to the metallic ink reduction region, the ink duty limit value of the color is reduced and the metallic ink amount Sv is added.

D9. Modified Example 9

In the respective embodiments, a part of the configuration realized by software may be replaced with hardware. Furthermore, in contrast to this, a part of the configuration realized by hardware may be replaced with software.

What is claimed is:

1. A printing apparatus which performs the printing using a polish and a colorant, the printing apparatus comprising:
    a reduction region setting portion that sets a reduction region, which is a region where an amount of the polish is reduced, at a dark portion side of a color gamut of the printing apparatus in a device-independent color space; and
    a color conversion portion which converts color of an image to be input to the printing apparatus into a print color to be expressed by the polish and the colorant,
    wherein, among pixels constituting the image, in a pixel included in the reduction region, the color conversion portion reduces an amount of the polish compared to a pixel not included in the reduction region, and converts color of the image to the print color,
    wherein the reduction region setting portion has:
    an acquisition portion which acquires a plurality of intersection points obtained for each of a plurality of hues in which a relation line indicating a relationship between a color gradation of a printing region of the case of performing the printing only using the colorant and an index value relating to a color brightness intersects with a relation line indicating a relationship between a color gradation of a printing region of the case of performing the printing using the colorant and the polish and the index value;
    a three-dimensional shape determination portion which determines a predetermined three-dimensional shape in the color space, based on a plurality of reduction region reference points which are points corresponding to the plurality of intersection points in the color space; and
    a region determination portion that obtains an overlap region between the color gamut and an inner portion of the three-dimensional shape and determines the overlap region as the reduction region.

2. The printing apparatus according to claim 1, wherein the color conversion portion converts the pixel included in the reduction region among the pixels constituting the image to the print color in which the amount of the polish is 0.

3. The printing apparatus according to claim 1, wherein the predetermined three-dimensional shape is an elliptical shape in which a surface of the elliptical shape is disposed in the color space so as to be close to the plurality of reduction region reference points.

4. The printing apparatus according to claim 3, wherein the color space is a L*a*b* color space, and a value of L* of a central position of the elliptical shape is negative.

5. The printing apparatus according to claim 1, wherein the predetermined three-dimensional shape is an umbrella shape that is formed by a plurality of planes specified by two arbitrary reduction region reference points adjacent to each other and a specific reference point among other reduction region reference points except for the specific reference point, in the color space, by using the specific reference point, which is a reduction region reference point corresponding to the intersection point obtained in a gray axis, as a vertex, among the plurality of reduction region reference points.

6. The printing apparatus according to claim 1,
wherein the predetermined three-dimensional shape is an arm shape that is specified by an annular periodic spline curve obtained using another reduction region reference point except for a specific reference point which is a reduction region reference point corresponding to the intersection point obtained in a gray axis among the plurality of reduction region reference points, and a secondary curve that sets the specific reference point as a vertex and passes through two other arbitrary reduction region reference points.

7. The printing apparatus according to claim 1,
wherein the index value is a lightness that is measured by setting an irradiation angle to 45° and a light receiving angle to 0°.

8. The printing apparatus according to claim 1, further including:
a printing portion that prints an image converted to the print color and obtains a print image,
wherein the color space has at least a coordinate axis concerning the color brightness, and
when the printing portion prints the image in which the color expressed by each coordinate included in an arbitrary plane including the coordinate axis in the color space is expressed while maintaining an arrangement relationship of each coordinate, in the print image, boundaries between a region having a dot recording rate of the polish equal to or less than a predetermined value and a region having the dot recording rate greater than the predetermined value are continuously disposed.

9. A printing control device which controls a printing apparatus performing the printing using a polish and a colorant, the printing control device comprising:
a reduction region setting portion that sets a reduction region, which is a region where an amount of the polish is reduced, at a dark portion side of a color gamut of the printing apparatus in a device-independent color space; and
a color conversion portion that converts color of the image to be input to the printing control device to a print color expressed by the polish and the colorant,
wherein, among the pixels constituting the image, the pixel included in the reduction region is given a reduced amount of the polish compared to the pixel not included in the reduction region and the color of the image is converted to the print color,
wherein the reduction region setting portion has:
an acquisition portion which acquires a plurality of intersection points obtained for each of a plurality of hues in which a relation line indicating a relationship between a color gradation of a printing region of the case of performing the printing only using the colorant and an index value relating to a color brightness intersects with a relation line indicating a relationship between a color gradation of a printing region of the case of performing the printing using the colorant and the polish and the index value;
a three-dimensional shape determination portion which determines a predetermined three-dimensional shape in the color space, based on a plurality of reduction region reference points which are points corresponding to the plurality of intersection points in the color space; and
a region determination portion that obtains an overlap region between the color gamut and an inner portion of the three-dimensional shape and determines the overlap region as the reduction region.

10. A color conversion method of converting color of an image to a print color that is expressed by a polish and a colorant used in a printing apparatus, the method comprising:
(a) setting a reduction region, which is a region where an amount of the polish is reduced, at a dark portion side of a color gamut of the printing apparatus in a device-independent color space; and
(b) reducing an amount of the polish in a pixel included in the reduction region among pixels constituting the image, compared to a pixel not included in the reduction region, and converting the color of the image to the print color
wherein the above step are executed by a processor of the printing apparatus,
wherein setting the reduction region includes:
acquiring a plurality of intersection points obtained for each of a plurality of hues in which a relation line indicating a relationship between a color gradation of a printing region of the case of performing the printing only using the colorant and an index value relating to a color brightness intersects with a relation line indicating a relationship between a color gradation of a printing region of the case of performing the printing using the colorant and the polish and the index value;
determining a predetermined three-dimensional shape in the color space, based on a plurality of reduction region reference points which are points corresponding to the plurality of intersection points in the color space; and
obtaining an overlap region between the color gamut and an inner portion of the three-dimensional shape and determines the overlap region as the reduction region.

11. A computer readable storage medium storing computer program for converting color of an image to a print color expressed by a polish and a colorant used in a printing apparatus, the program causing a computer to realize:
a function of setting a reduction region, which is a region reducing an amount of the polish, at a dark portion side of a color gamut of the printing apparatus in a device-independent color space; and
a function of reducing an amount of the polish in a pixel included in the reduction region among the pixels constituting the image, compared to a pixel not included in the reduction region, and converting the color of the image to the print color,
wherein the function of setting the reduction region includes:
acquiring a plurality of intersection points obtained for each of a plurality of hues in which a relation line indicating a relationship between a color gradation of a printing region of the case of performing the printing only using the colorant and an index value relating to a color brightness intersects with a relation line indicating a relationship between a color gradation of a printing region of the case of performing the printing using the colorant and the polish and the index value;
determining a predetermined three-dimensional shape in the color space, based on a plurality of reduction region reference points which are points corresponding to the plurality of intersection points in the color space; and
obtaining an overlap region between the color gamut and an inner portion of the three-dimensional shape and determines the overlap region as the reduction region.

* * * * *